(No Model.)
L. EVEN & J. T. CROWE.
TONGUE SUPPORT.
No. 524,822.  Patented Aug. 21, 1894.
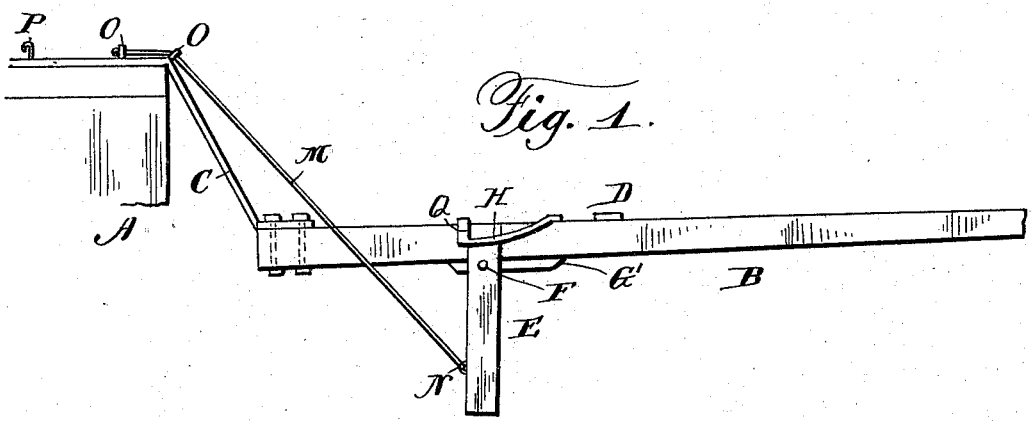
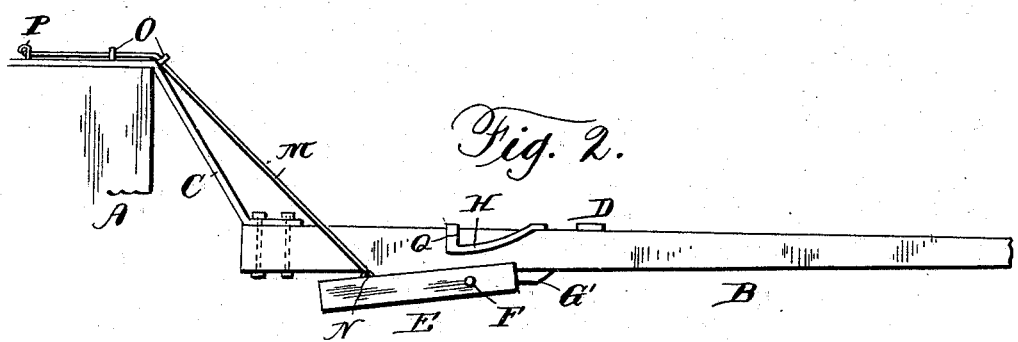
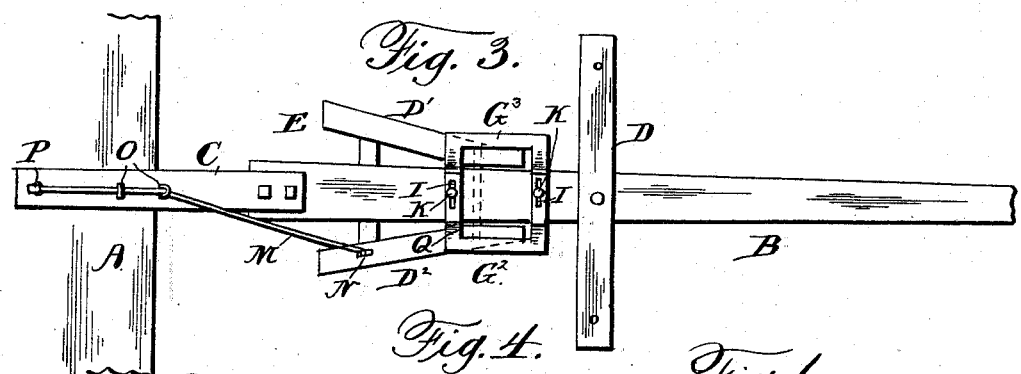
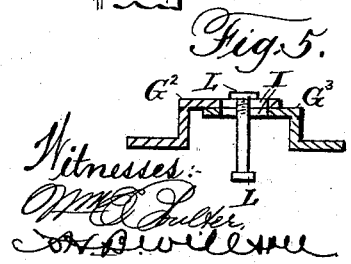
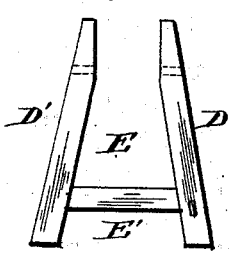

UNITED STATES PATENT OFFICE.

LOUIS EVEN AND JOHN THOS. CROWE, OF JEFFRIESBURG, MISSOURI; SAID EVEN ASSIGNOR TO SAID CROWE.

TONGUE-SUPPORT.

SPECIFICATION forming part of Letters Patent No. 524,822, dated August 21, 1894.

Application filed February 12, 1894. Serial No. 499,910. (No model.)

*To all whom it may concern:*

Be it known that we, LOUIS EVEN and JOHN THOMAS CROWE, citizens of the United States, residing at Jeffriesburg, in the county of Franklin and State of Missouri, have invented certain new and useful Improvements in Self-Adjusting Tongue-Supports; and we do declare the following to be a full, clear, and exact description of the invention, such as will enable others skilled in the art to which it appertains to make and use the same, reference being had to the accompanying drawings, and to the letters of reference marked thereon, which form a part of this specification.

Our invention has relation to tongue-supports, and it has for its objects to provide an extremely simple, inexpensive and efficient device adapted to support the tongue of a vehicle or machine, such as reapers, mowers, binders, headers, &c., and to be readily operated to free the ground when the machine is to be put in motion, and with the above and other objects in view, the invention consists in the novel construction, arrangement and combination of parts as hereinafter fully described, illustrated in the drawings, and pointed out in the claims.

In the accompanying drawings:—Figure 1 is a side elevation illustrating the improved tongue-support in its lowered position to support the tongue. Fig. 2 is a similar view showing the support drawn up to free the ground. Fig. 3 is a plan view of the parts as seen in Fig. 2. Fig. 4 is a front view of the support proper. Fig. 5 is a sectional view of the adjustable stop-frame. Fig. 6 is a plan view of a non-adjustable stop-frame.

Referring to the above described drawings, A indicates a portion of a vehicle or machine the tongue of which is adapted to be supported by our improved device, though we preferably intend our device to be applied to reapers, mowers, binders, headers and other harvesting machines operated by horse power.

B indicates the tongue of the machine which is connected to the same by any suitable means as for instance the connecting bar C.

D indicates an ordinary double tree attached to the tongue.

E indicates the tongue-support which may be constructed of any suitable or desired materials, said support being constructed in the form shown more clearly in Fig. 4, *i. e.* with the side pieces $D'$, $D^2$, and the connecting or brace piece $E'$, connecting the pieces $D'$ $D^2$ toward their lower ends. The said pieces $D'$ $D^2$ are adapted to embrace the tongue between their upper ends, and said support is pivotally connected to the tongue by means of a rod F which passes through the upper ends of the pieces $D'$ $D^2$ and a bearing piece $G'$ secured upon the under side of the tongue.

The pieces $D'$ $D^2$ are made sufficiently long to adapt them to rest upon the ground and when in this position to support the tongue and thus relieve the weight of the machine from the necks of the animals, or to support the tongue when the machine is not in use.

For the purpose of preventing the support D from being moved too far past a perpendicular position we employ a stop plate G adapted to be secured to the tongue in a position to cause the upper ends of the support to engage with the same when in an upright position, as seen in Fig. 1, said plate G being bent downwardly upon each side of the tongue as at H, and adapted to permit the upper ends of the pieces $D'$ $D^2$ passing between the sides of the plate and the tongue when the tongue-support is raised to its upright position seen in said Fig. 1, said upper ends of the pieces $D'$ $D^2$ then bearing against the plate in the manner seen in said figure, and thus being held from moving beyond its said upright position.

The stop plate we preferably make adjustable transversely so as to adapt the same to be applied to tongues of varying widths, such a construction being seen in Figs. 1, 2, 3, and 5, though if we desire we may employ a non-adjustable plate as seen in Fig. 6.

In the first construction, we show the plate as consisting of two separate sections $G^2$ $G^3$, each having the angular shape shown, and being bent downwardly upon each side of the tongue as seen at H. The arms of the said sections are adapted to overlap each other, and their overlapping ends are provided with slots I extending transversely, and through which slots pass bolts K which extend through the tongue and provided at their opposite ends with tightening nuts L.

It will thus be seen that by loosening the upper nuts on the bolts, the sections of the stop-plate may be adjusted to the desired degree after which said nuts are again tightened to hold the sections firmly in position.

The stop-plate seen in Fig. 6 is made of one piece bent to the required shape, and being secured to the tongue by the bolts K and nuts L.

For operating the tongue-support from the driver's seat we provide any suitable means, preferably a rope M which is attached to the support at N, and passes upwardly and through eyes O and back to a position to be easily reached by the driver.

When the machine is in motion the support is drawn upwardly into the position seen in Fig. 1, the rope being hooked over or secured to a hook P. When it is desired to lower the support to permit it to support the tongue, the rope is released from hook P and the support will then drop down by its own weight to the perpendicular position, the upper ends of the pieces D' D² of which engaging with the downwardly bent portions of the stop plate at the points Q and being thereby held in such perpendicular position.

By reason of the driver balancing to some extent the weight on the tongue, he can readily draw up the support after mounting to his seat, which is very convenient.

The advantages to be derived from the use of our invention will be readily seen and appreciated by those having use for this class of devices.

What we claim, and desire to secure by Letters Patent, is—

1. The combination with a tongue of a vehicle or machine, of the support E, comprising the side pieces D' D² and rigid connecting or brace piece E', said pieces D' D² embracing the tongue at their upper ends, a rod passing through the pieces D' D² and the tongue to pivotally connect the support to the latter a stop plate G secured upon the upper face of the tongue, said plate being of hollow rectangular shape and being bent down upon each side of the tongue as at H said plate G being arranged to receive the upper ends of the support E and to operate as a stop for the latter when said support is in a vertical position, and an operating rope connected with the support, as described.

2. The combination with a tongue of a vehicle or machine, of the support E comprising the side pieces D' D² and rigid connecting or brace piece E', said pieces D' D² embracing the tongue at their upper ends, a rod passing through the pieces D' D² and the tongue to pivotally connect the support to the latter a stop plate G secured upon the upper face of the tongue, said plate being of hollow rectangular shape and consisting of two sections overlapping each other each of which is provided with a slot, a securing bolt passing through said slots and the tongue, said sections being bent down upon each side of the tongue and being arranged to receive the upper ends of support E to operate as a stop for the latter when said support is in a vertical position and an operating rope connected with the support, as and for the purpose specified.

In testimony whereof we have affixed our signatures in presence of two witnesses.

LOUIS EVEN.
JOHN THOS. CROWE.

Witnesses:
JOS. ECKERT,
DOLPHUS A. SCHUSTER.